(12) United States Patent
Zink, Jr. et al.

(10) Patent No.: US 7,716,866 B2
(45) Date of Patent: May 18, 2010

(54) AVIAN DECOY

(75) Inventors: Fred Lee Zink, Jr., Clayton, OH (US); Thomas B. J. Matthews, Memphis, TN (US)

(73) Assignee: Avery Outdoors, Inc., Memphis, TN (US)

( * ) Notice: Subject to any disclaimer, the term of this patent is extended or adjusted under 35 U.S.C. 154(b) by 888 days.

(21) Appl. No.: 11/481,413

(22) Filed: Jul. 5, 2006

(65) Prior Publication Data

US 2007/0180753 A1    Aug. 9, 2007

Related U.S. Application Data

(63) Continuation-in-part of application No. 11/350,973, filed on Feb. 9, 2006, now Pat. No. 7,694,451.

(51) Int. Cl.
*A01M 31/06* (2006.01)
(52) U.S. Cl. .......................................................... 43/3
(58) Field of Classification Search ................ 43/2, 43/3
See application file for complete search history.

(56) References Cited

U.S. PATENT DOCUMENTS

| 2,323,040 | A | 6/1943 | Hirsch |
| 2,450,572 | A | 10/1948 | Ballard |
| 4,893,428 | A | 1/1990 | Gagnon |
| 5,392,554 | A | 2/1995 | Farstad et al. |
| 5,570,531 | A | 11/1996 | Sroka |
| 7,493,723 | B2 | 2/2009 | Hess |
| 2005/0132632 | A1 * | 6/2005 | Fisher ............................. 43/3 |
| 2006/0053675 | A1 | 3/2006 | Lindaman |
| 2006/0143970 | A1 * | 7/2006 | Lindaman ........................ 43/2 |
| 2007/0062093 | A1 | 3/2007 | Hess |
| 2008/0209792 | A1 | 9/2008 | Watlov |

* cited by examiner

*Primary Examiner*—Kimberly S Smith
(74) *Attorney, Agent, or Firm*—Walker, McKenzie & Walker, P.C.

(57) ABSTRACT

An avian decoy including a decoy body; a stake having an upper end for rotatably supporting the decoy body, and having a lower end for being anchored to a support surface; and a guide for guiding the upper end of the stake into proper position in the decoy body.

2 Claims, 11 Drawing Sheets

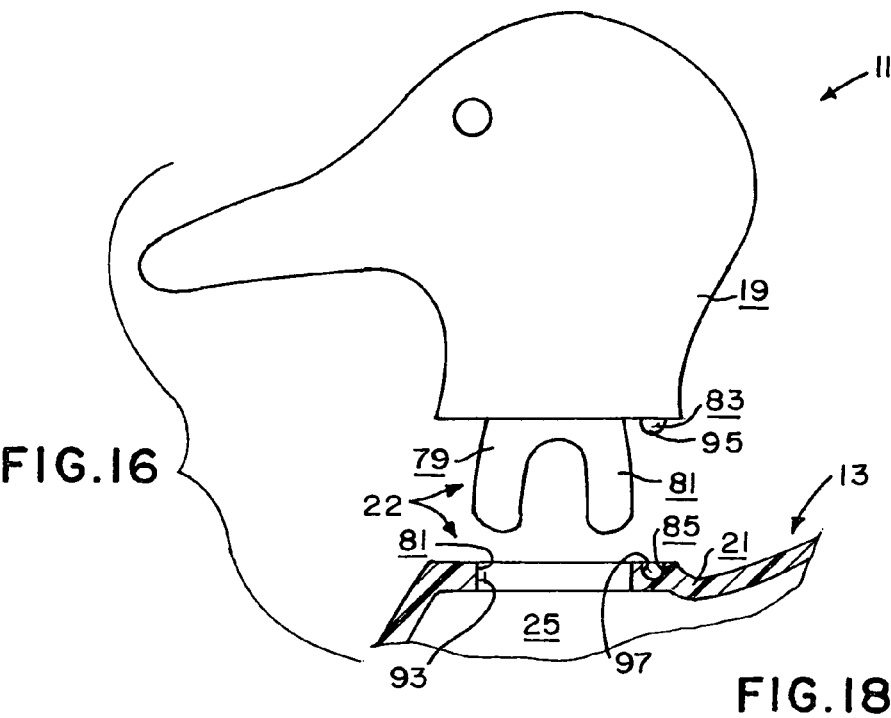
FIG. 16
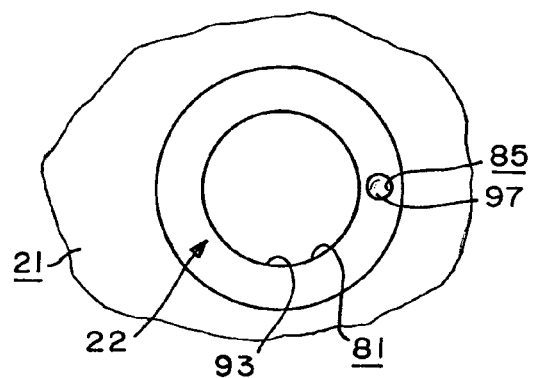
FIG. 17
FIG. 18
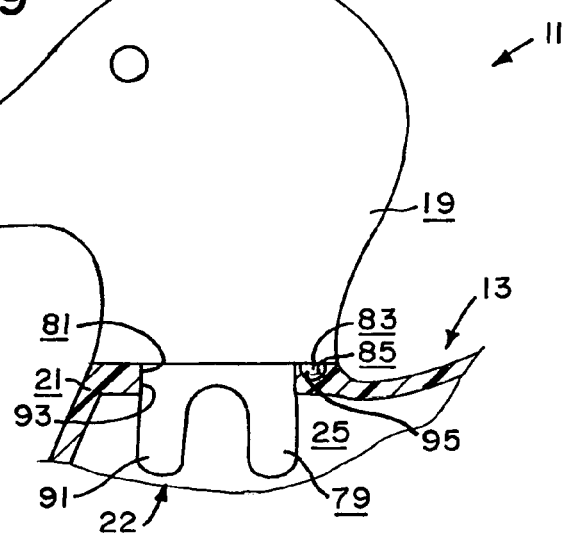
FIG. 19

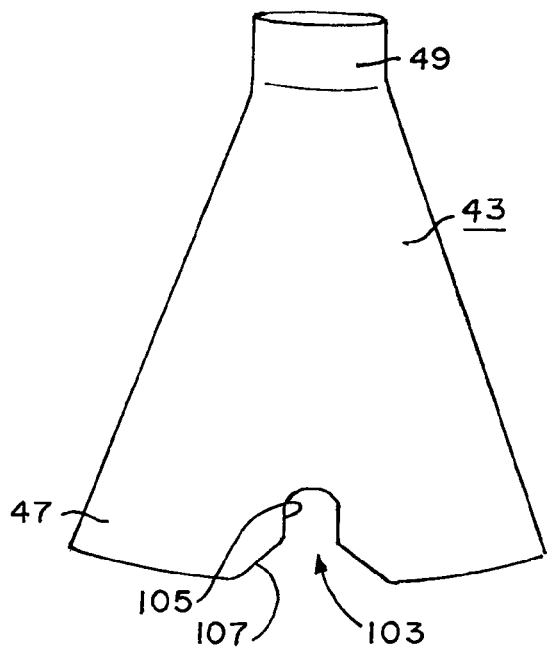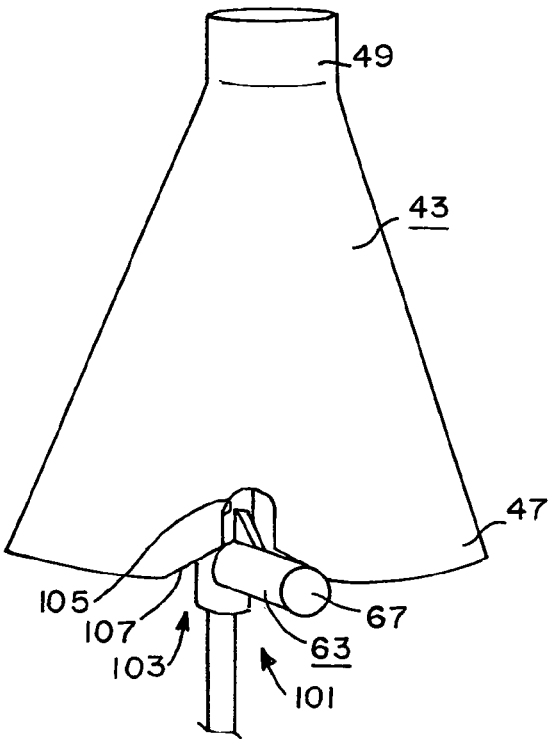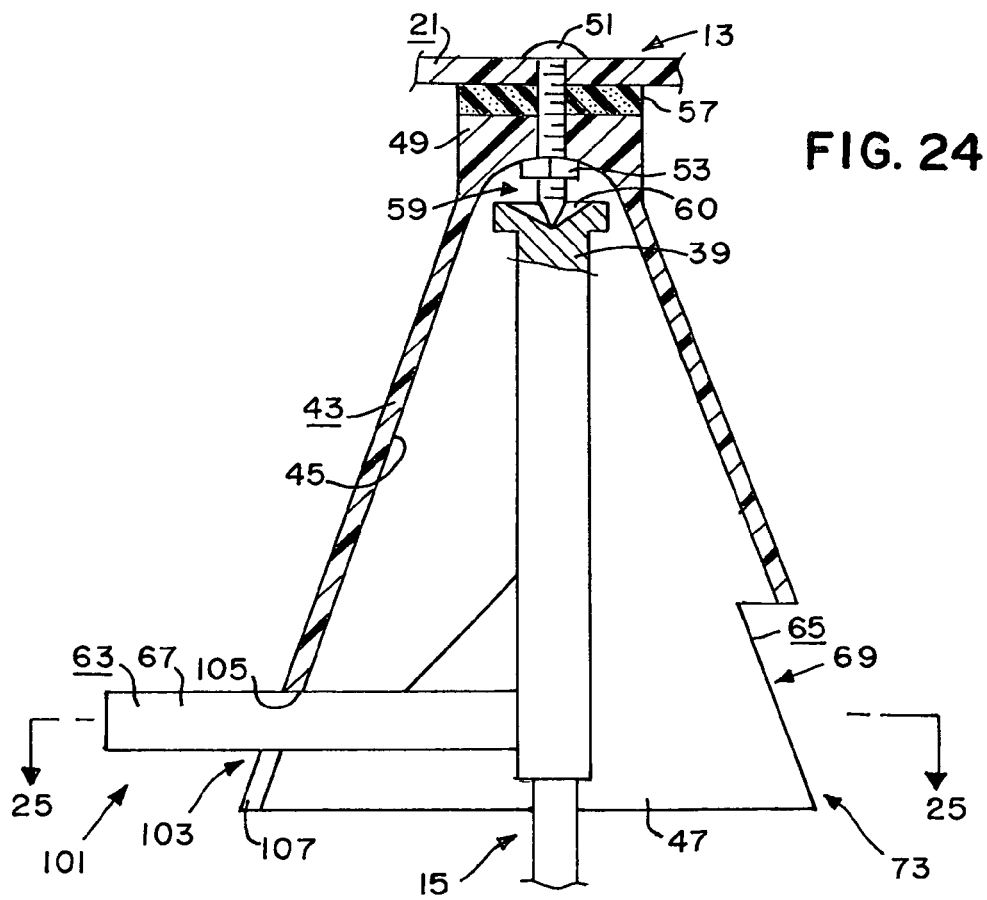

AVIAN DECOY

CROSS REFERENCE TO RELATED APPLICATION

This application is a continuation-in-part of application Ser. No. 11/350,973, filed Feb. 9, 2006, entitled "Avian Decoy," now pending.

BACKGROUND OF THE INVENTION

1. Field of the Invention

The present invention relates, in general, to avian decoys, and primarily to standing duck and geese decoys, etc., adapted to rotate back and forth, side-to-side about a vertical axis.

2. Background Art

It is often desired to have a decoy spread (a plurality of decoys arranged on a field or the like) with one or more of the decoys providing a wind generated, side-to-side movement about a substantially vertical axis. The prior art discloses windsock-type decoys, or hard bodied decoys rotatably mounted on vertical stakes.

Such decoy spreads are typically set in the field well before daylight and the ease of setting up the individual decoys is critical. While windsock-type decoys are normally fixedly attached to stakes so they can be set up quickly as one piece units, stakes for hard bodied rotatable decoys are set up first and then the decoy bodies are set onto the top of the stakes, typically causing the user to align the top of the stakes with small holes in the bottom of the decoy bodies, which is difficult and time consuming.

Another problem with prior art decoys is that they typically include rigid leg portions which often break off during transport to and from the field and sometimes drag or become tangled when the decoys are set up in snow or fields with high vegetation, thus interfering with the movement of the decoy bodies.

Another problem with prior art decoys is the space required to transport and store hard bodied decoys. One solution is to make such decoys with separate head and body portions for easy transport and storage, but the user must be extra careful when attaching the head and body portions together to insure that the head portion is properly positioned on the body portion.

Nothing in the know prior art discloses or suggests the present invention.

BRIEF SUMMARY OF THE INVENTION

The present invention provides an avian decoy adapted to rotate back and forth about a vertical axis.

It is an object of the present invention to provide an easy-to-use, avian decoy, e.g., a standing duck or goose decoy, that has wind generated, side-to-side movement about a substantially vertical axis.

It is another object of the present invention to provide such a decoy with a stake for supporting a decoy body, and means for guiding the upper end of the stake into the decoy body.

It is another object of the present invention to provide such a decoy with movable leg stubs.

It is another object of the present invention to provide such a decoy with movable leg stubs that can be folded inside the decoy body.

It is another object of the present invention to provide such a decoy with means for limiting the rotation of the decoy body on the stake.

It is another object of the present invention to provide such a decoy with directional lock means for preventing any rotation of the decoy body on the stake if and when desired.

It is another object of the present invention to provide such a decoy with means for attaching and properly positioning a head portion on a body portion.

BRIEF DESCRIPTION OF THE SEVERAL VIEWS OF THE DRAWINGS

FIG. 16 is a somewhat diagrammatic, exploded view of a second embodiment of an accurately positionable, removable head portion of the decoy body of the avian decoy of the present invention, with portions thereof broken away for clarity.

FIG. 17 is a bottom plan view of the neck of the head portion of the decoy body of FIG. 16 with portions thereof omitted for clarity.

FIG. 18 is a top plan view of the neck of the body portion of the decoy body of FIG. 16 with portions thereof broken away for clarity.

FIG. 19 is a somewhat diagrammatic, assembled view of the accurately positionable, removable head portion of FIG. 16.

FIG. 22 is a somewhat diagrammatic perspective view similar to FIG. 21 but with portions of the directional lock means omitted for clarity.

FIG. 23 is a somewhat diagrammatic perspective view similar to FIG. 21 but showing the directional lock means in a partially engaged position.

FIG. 24 is an enlarged sectional view of portions of the decoy of FIG. 20, with portions thereof broken away for clarity, and showing the directional lock means in a fully engaged position.

DETAILED DESCRIPTION OF THE INVENTION

Figure 1:
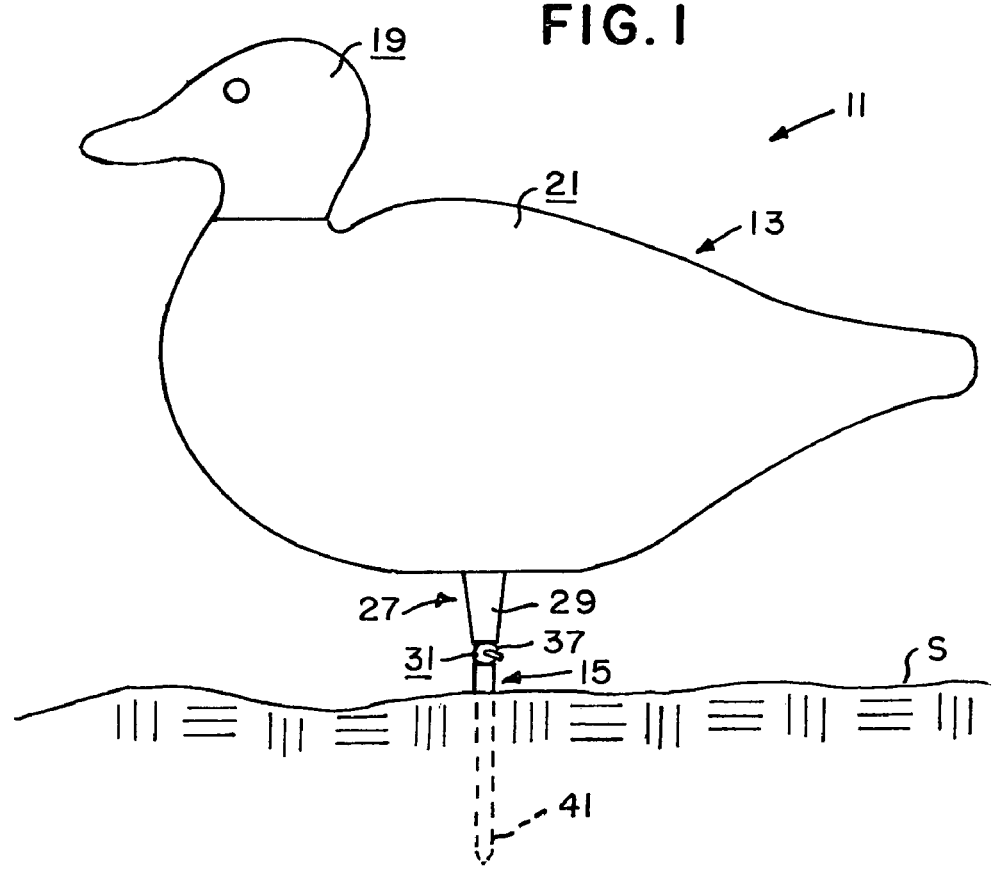
FIG. 1 is a somewhat diagrammatic side elevational view of the avian decoy of the present invention showing a first embodiment of a stake thereof.
Figure 2:
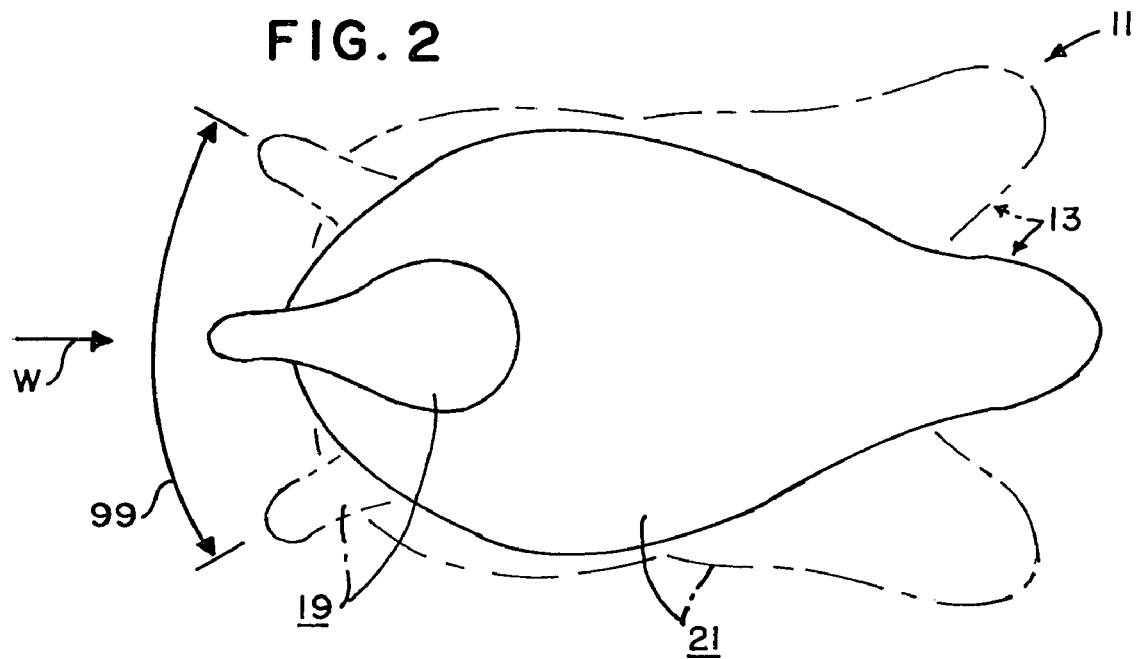
FIG. 2 is a somewhat diagrammatic top plan view of the decoy of FIG. 1, showing the range of motion of the decoy body thereof about a vertical axis in broken lines.
Figure 3:
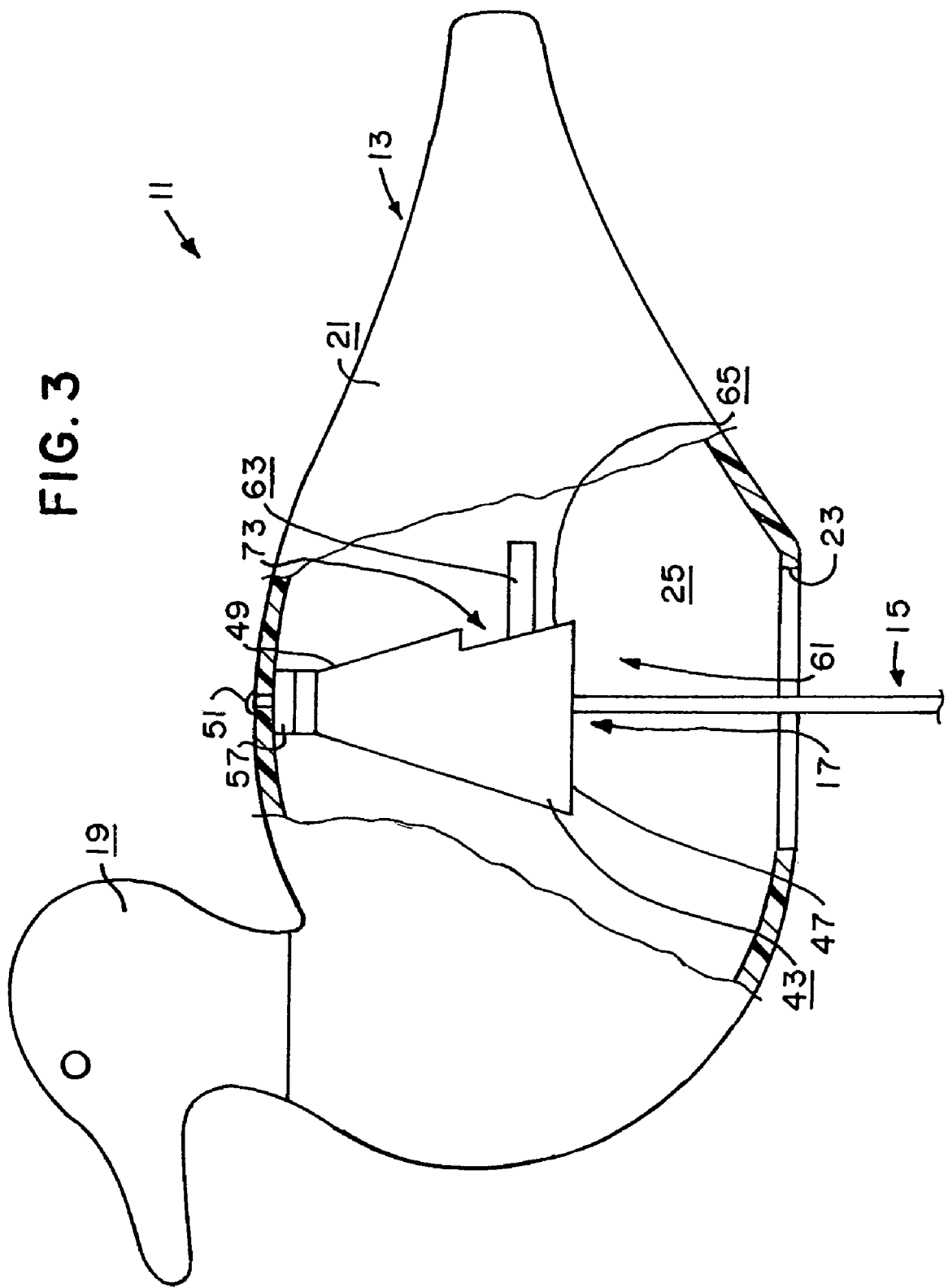
FIG. 3 is a somewhat diagrammatic side elevational view of the decoy of the FIG. 1, with portions thereof broken away for clarity, showing a first embodiment of a directional stop means thereof.
Figure 4:
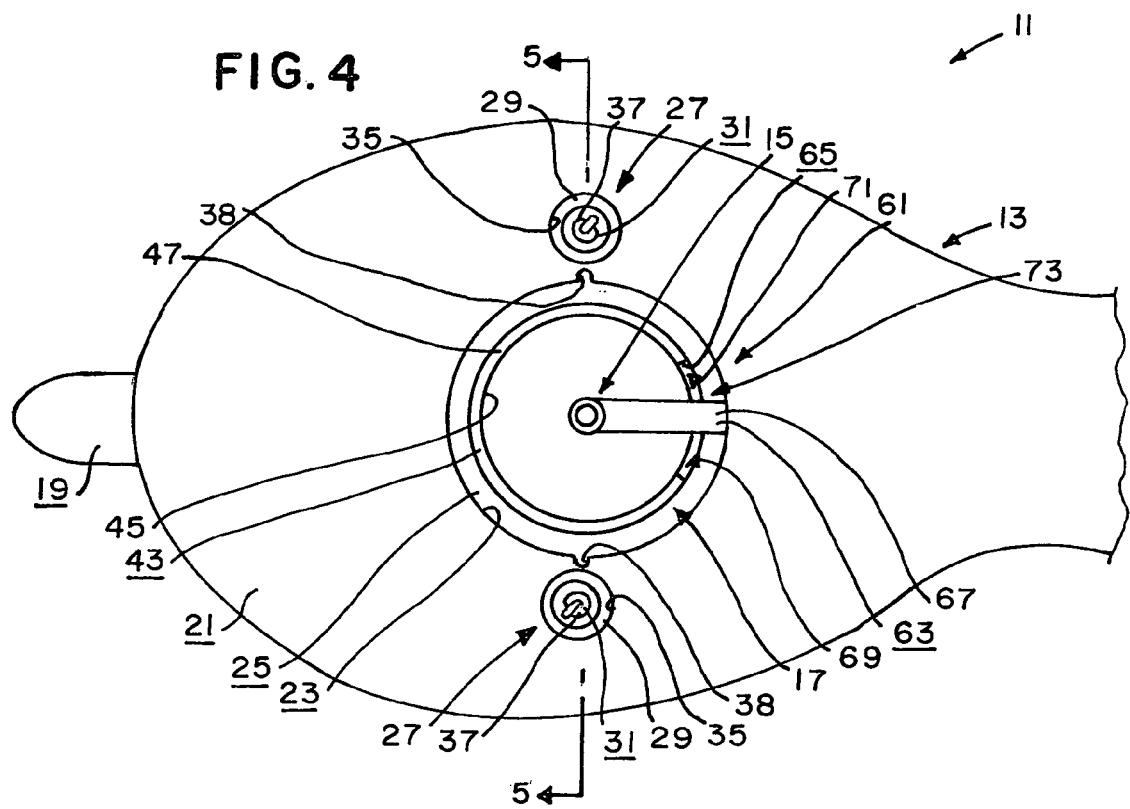
FIG. 4 is a bottom plan view of the decoy of FIG. 1, with portions thereof broken away for clarity, showing the first embodiment of the directional stop means.
Figure 5:
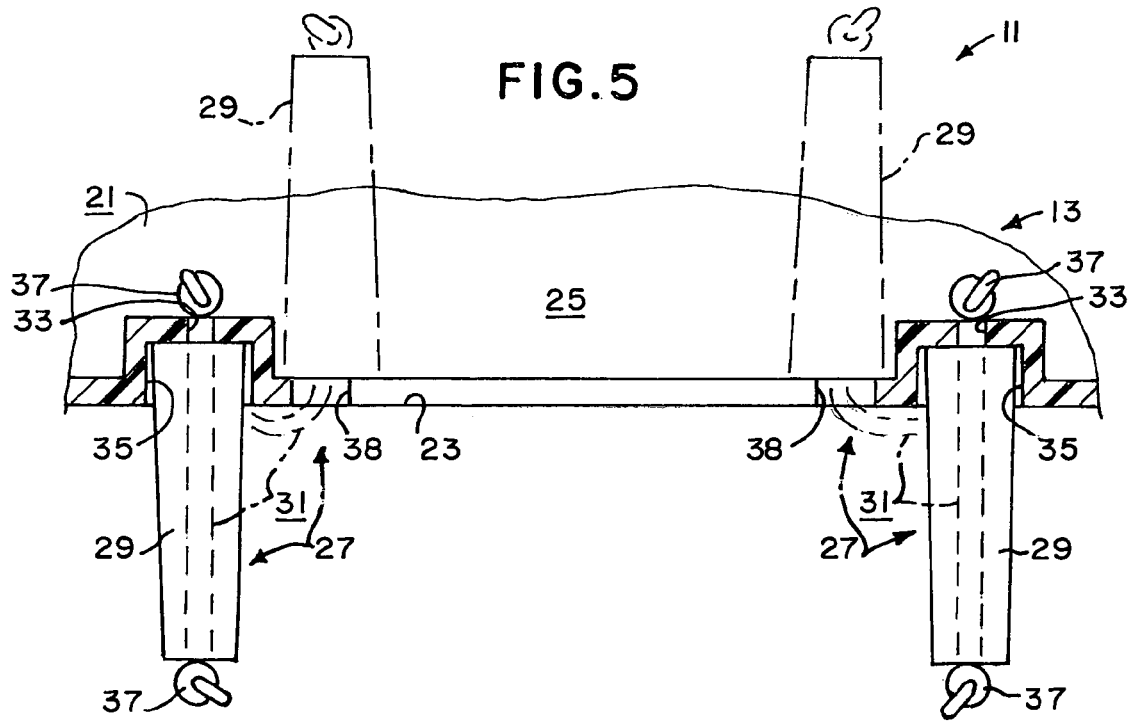
FIG. 5 is an enlarged sectional view substantially as taken on line 5-5 of FIG. 4 with portions thereof broken away for clarity and parts thereof shown in moved positions in broken lines.

An avian decoy of the present invention is shown in FIGS. 1-25 and identified by the numeral 11.

The decoy 11 includes, in general, a decoy body 13, a stake 15 for supporting the decoy body 13 on a support surface S such as the ground; and guide means 17 for guiding the stake 15 into the decoy body 13.

The decoy body 13 includes a head portion 19 and a body portion 21. The decoy body 13 may be constructed as a one piece, integral unit or may be constructed as a multi-piece construct with, for example, the head portion 19 and body portion 21 being constructed as separate units joined to one another via an attachment means 22 for removably attaching the head portion 19 to the body portion 21 and for properly positioning the head portion 19 on the body portion 21 in a manner as will hereinafter be fully disclosed. The decoy body 13 may be molded or otherwise constructed out of various materials such as plastic (e.g., polyvinyl chloride-PVC) in various shapes and sizes to have the appearance of a duck, goose, or the like. The actual construction, size, and appearance of the decoy body 13 may vary depending on the user's desires. Thus, the decoy body 13 may have the general appearance of a feeder goose, looker goose, active goose, etc., as will now be apparent to those skilled in the art. The bottom of the decoy body 13 has an aperture 23 for receiving one end of the stake 15. At least a portion of the decoy body 13 has a hollow interior 25 for receiving at least a portion of the guide means 17, with the aperture 23 communicating with or opening into the hollow interior 25.

First and second leg stubs 27 are preferably attached to the decoy body 13, one on either sides of the aperture 23 to represent the avian legs. Each leg stub 27 is preferably movably attached to the decoy body 13, and can preferably be folded inside the decoy body 13 (i.e., into the hollow interior 25). Each leg stub 27 includes a generally conical cylinder 29 molded or otherwise constructed out of various materials such as plastic (e.g., polyvinyl chloride-PVC) in various specific shapes and sizes to have the appearance of the leg of a duck, goose, or the like, and an elongated elastic cord 31 extending through a respective cylinder 29 and a small hole 33 in recesses 35 provided in the decoy body 13 adjacent the aperture 23, with knots 37 tied in each end of the elastic cord 31 to thereby movably secure the cylinders 29 to the decoy body 13 (i.e., the elastic cords 31 will stretch to allow the cylinders 29 to be moved on the decoy body 13). The elastic cords 31 allows the decoy 11 to be tossed around without worrying that the leg stubs 27 will be damaged or broken off. If the leg stubs 27 are bumped they will bend and then spring back to the erect position. Further, the elastic cords 31 allow the leg stubs 27 to be manually folded inside the decoy body 13 as shown in broken lines in FIG. 5. Folding the leg stubs 27 inside the decoy body 13 is useful when using the decoy 11 is used in heavy snow or in fields with heavy stubble that might otherwise engage the leg stubs 27 and restrict motion of the decoy body 13, etc. Slots 38 may be provided in opposite sides of the aperture 23 to allow a portion of the cord 31 to extend therethrough when the leg stubs 27 are folded inside the decoy body 13 (see FIGS. 4, 5 and 10). The leg stubs 27 give the illusion of real legs and feet. However, since the leg stubs 27 are shortened, they will not likely cause the decoy body 13 to hang up in heavy snow or in fields with tall vegetation, etc.

Figure 8:
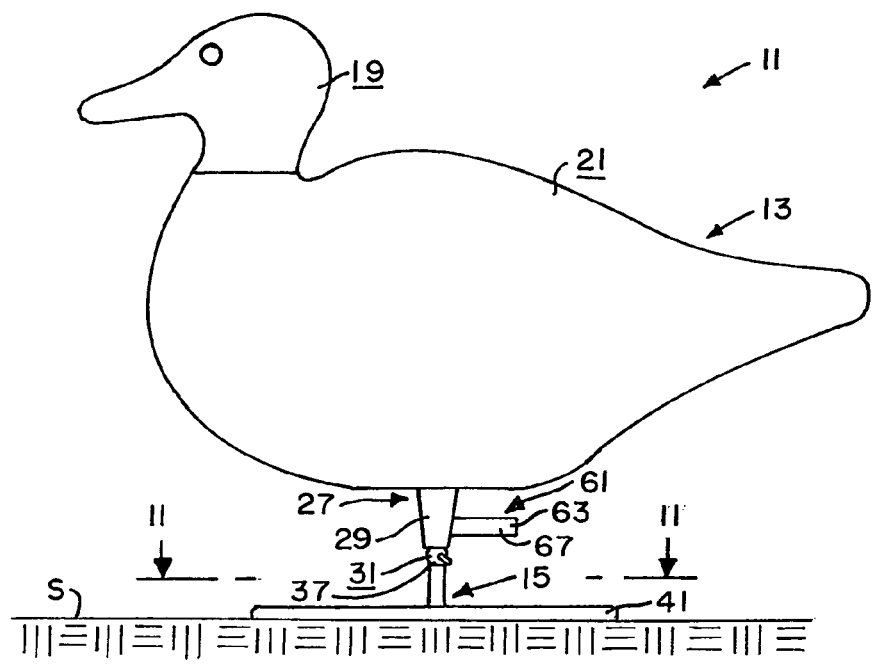
FIG. 8 is a somewhat diagrammatic side elevational view of the avian decoy of the present invention showing second embodiments of the stake and directional stop means.
Figure 11:
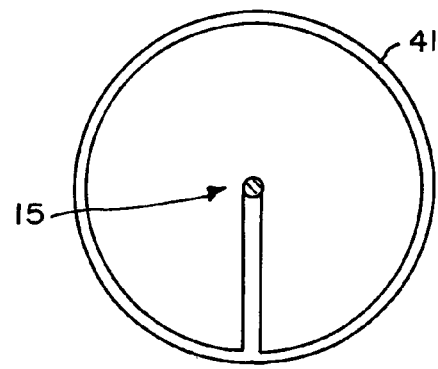
FIG. 11 is a sectional view substantial as taken on line 11-11 of FIG. 8.
Figure 12:
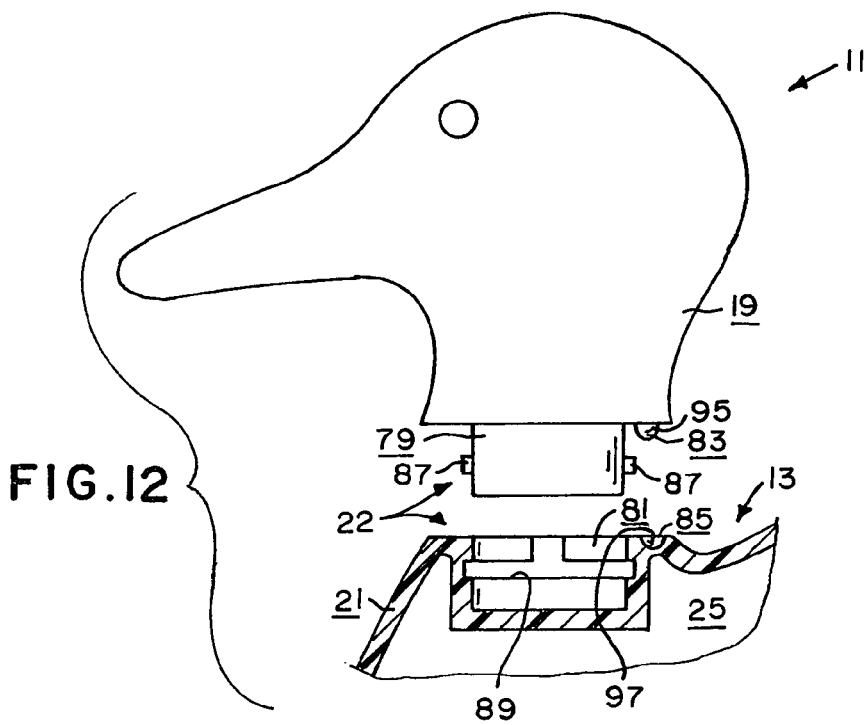
FIG. 12 is a somewhat diagrammatic, exploded view of a first embodiment of an accurately positionable, removable head portion of the decoy body of the avian decoy of the present invention, with portions thereof broken away for clarity.
Figure 13:
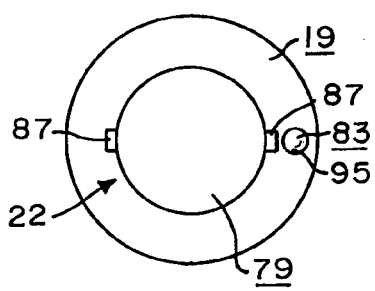
FIG. 13 is a bottom plan view of the neck of the head portion of the decoy body of FIG. 12 with portions thereof omitted for clarity.
Figure 14:
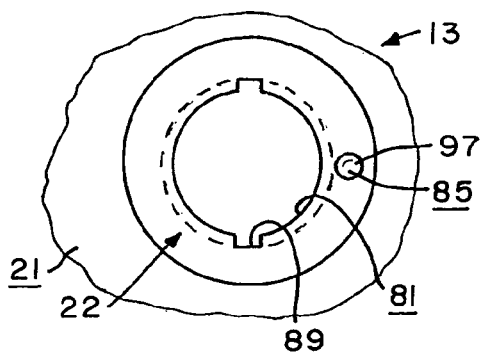
FIG. 14 is a top plan view of the neck of the body portion of the decoy body of FIG. 12 with portions thereof broken away for clarity.
Figure 15:
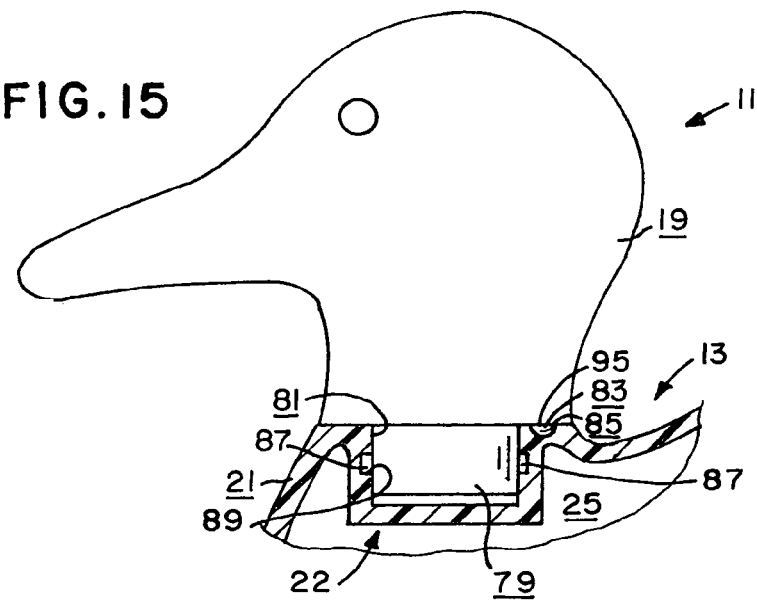
FIG. 15 is a somewhat diagrammatic, assembled view of the accurately positionable, removable head portion of FIG. 12.
Figure 20:
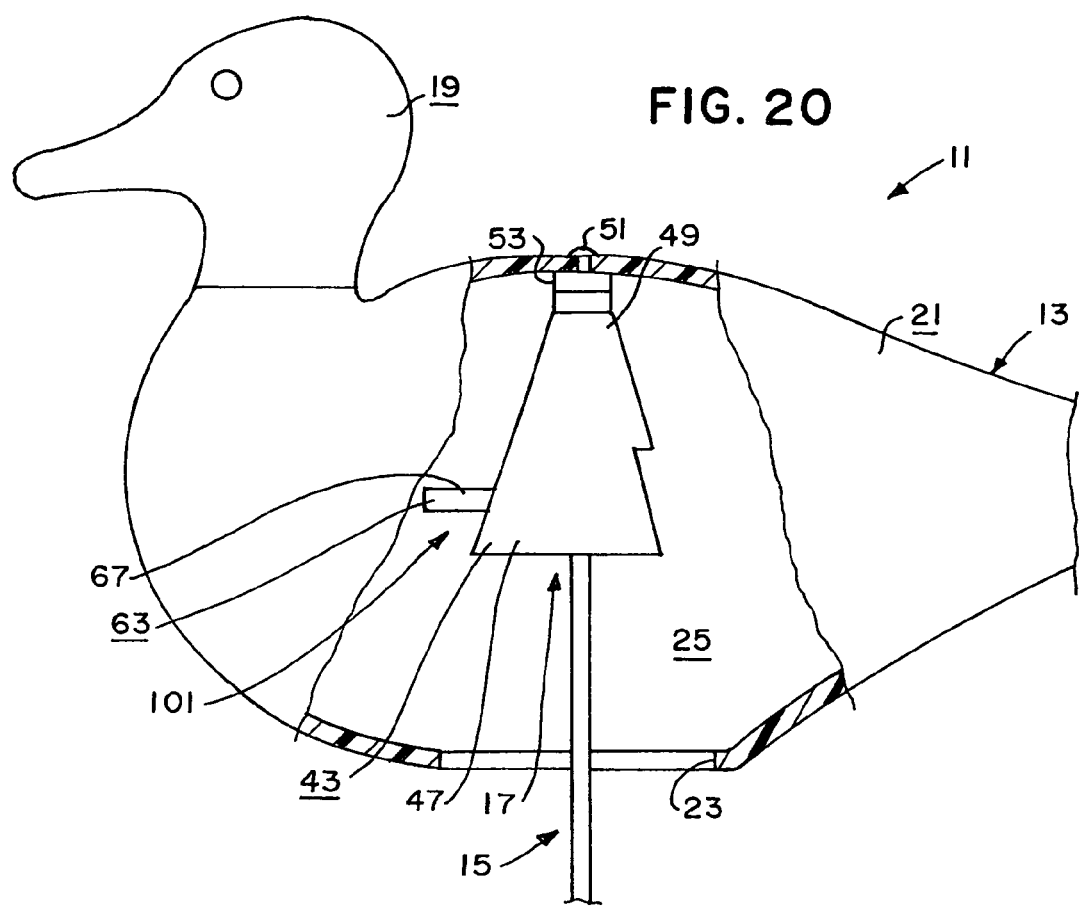
FIG. 20 is a somewhat diagrammatic side elevational view of the avian decoy of the present invention, similar to the decoy of FIG. 1, with portions thereof broken away for clarity, and showing a directional lock means for preventing any motion of the decoy body about a vertical axis.
Figure 21:
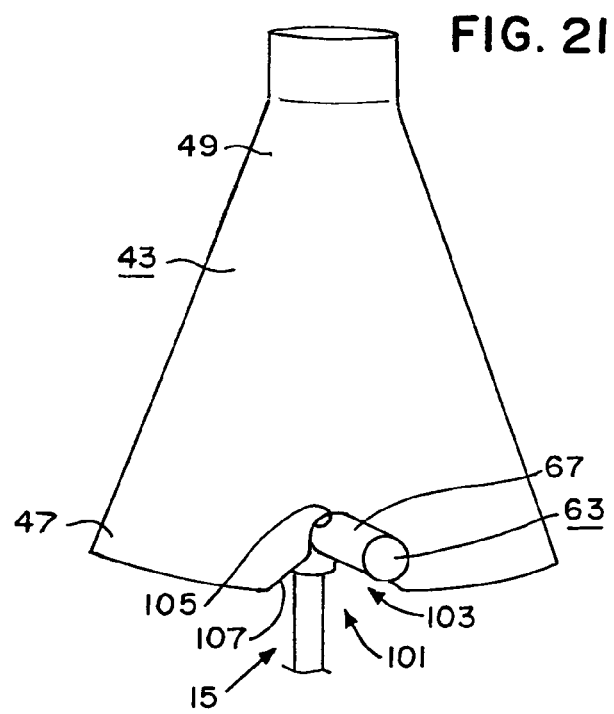
FIG. 21 is a somewhat diagrammatic perspective view showing of portions of FIG. 20 and showing the directional lock means in a fully engaged position.
Figure 25:
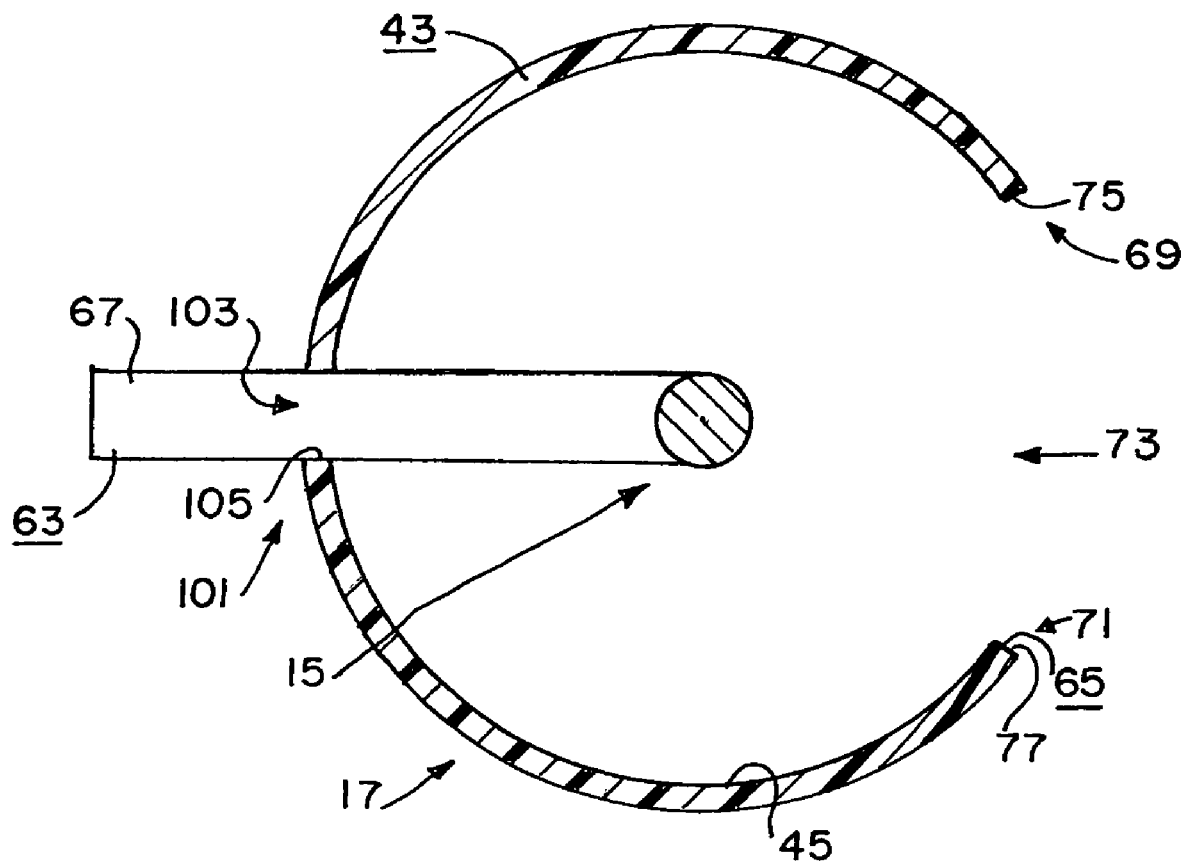
FIG. 25 is a somewhat diagrammatic sectional view substantially as taken on line 25-25 of FIG. 24.

The stake 15 has an upper end 39 for rotatably supporting the decoy body 13 (see FIGS. 6 and 9) and a lower end 41 for being anchored to the support surface S (see FIGS. 1, 8 and 11). The stake 15 may be machined, cut or otherwise constructed out of various materials such as a rigid metal rod in various specific shapes and sizes to support the decoy body 13 and be easily anchored to the support surface S. The lower end 41 of the stake 15 may be pointed for being inserted or pushed into the support surface S (see, in general, FIG. 1), or may have an enlarged base (e.g., may be bent into an opened, flat circle) for resting on top of the support surface S (see, in general, FIGS. 8 and 11).

The guide means 17 is designed for guiding the upper end 39 of the stake 15 into proper position in the decoy body 13. The guide means 17 preferably includes a funnel 43 for guiding the upper end 39 of the stake 15 into proper position. The funnel 43 is preferably positioned inside the decoy body 13, within, for example, the hollow interior 25. The funnel 43 may be molded or otherwise constructed out of various materials such as plastic (e.g., polyvinyl chloride-PVC) in various specific shapes and sizes. Preferably, the funnel 43 has an conical shaped inner surface or face 45 with a relatively large lower end 47 which tapers inwardly and to a relatively small upper end 49 so that when the upper end 39 of the stake 15 enters the aperture 23 in the bottom of the decoy body 13, it will engage the inner face 45 of the funnel 43 at the relatively large lower end 47 and slide upward and inwardly along the inner face 45 to the relatively small upper end 49. While the size of the funnel 43 may vary, for a typical size duck decoy the funnel 43 may have a diameter at the lower end 47 of approximately 3.5 inches (approximately 8.89 centimeters), and a diameter at the upper end 49 of approximately 0.75 inches (approximately 1.905 centimeters).

Figure 6:
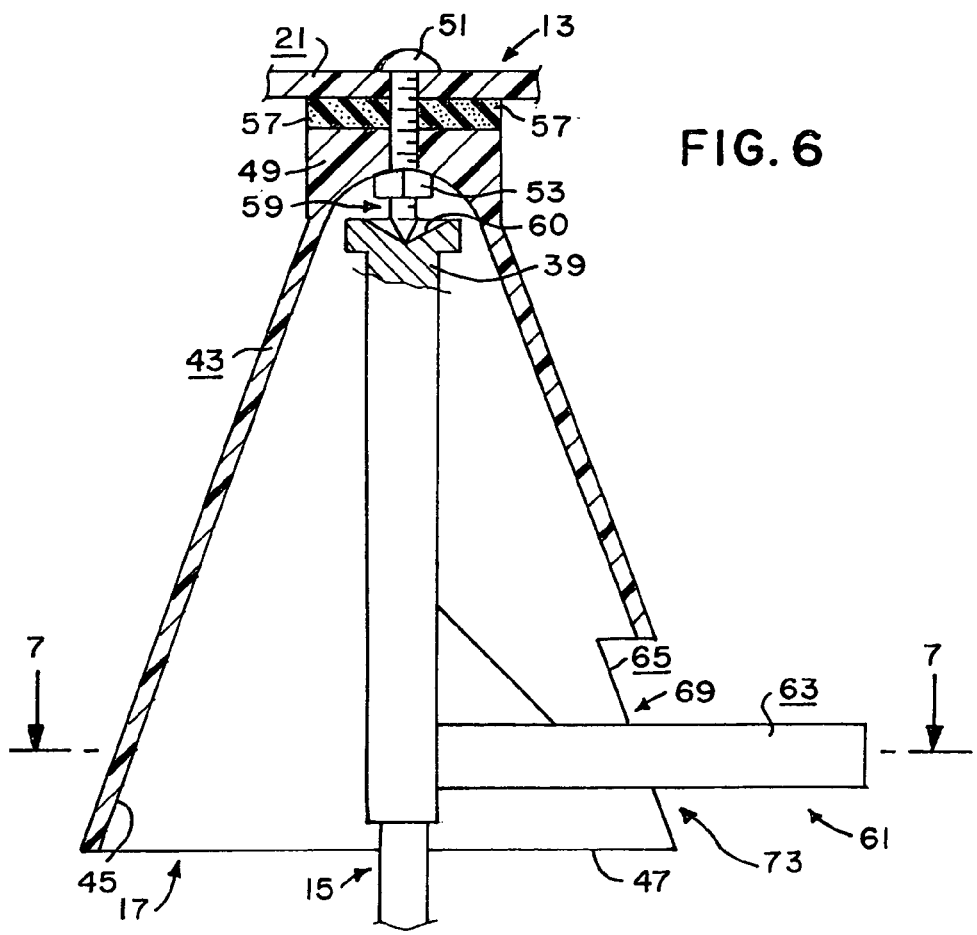
FIG. 6 is an enlarged sectional view of portions of the decoy of FIG. 1, with portions thereof broken away for clarity, showing the first embodiment of the directional stop means.
Figure 7:
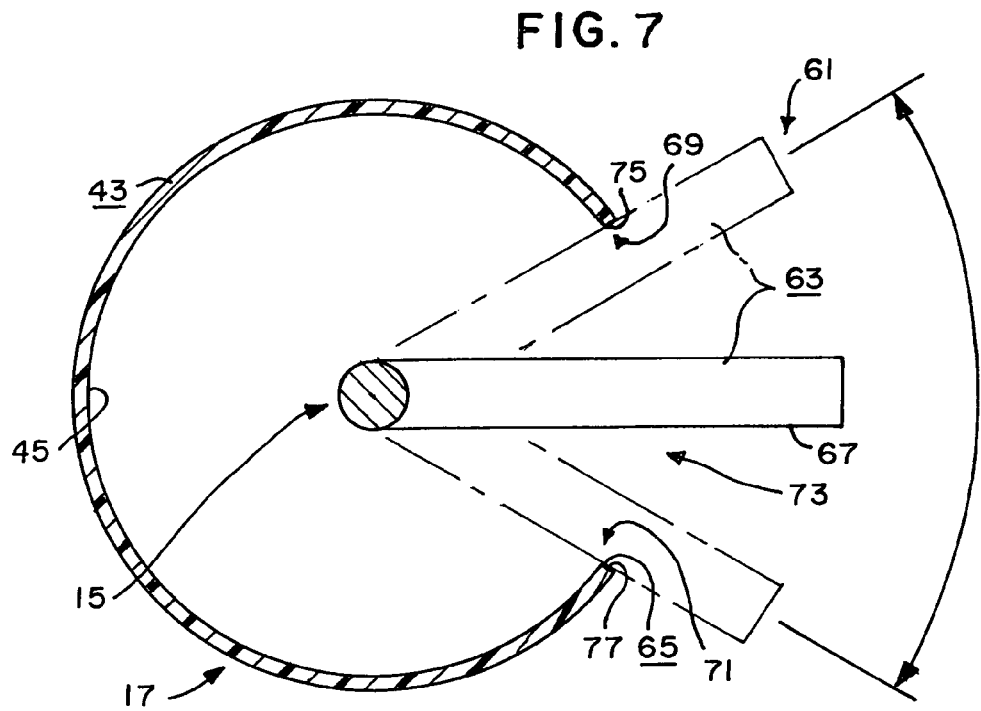
FIG. 7 is a somewhat diagrammatic sectional view substantially as taken on line 7-7 of FIG. 6, showing the range of motion of parts of the directional stop means thereof in broken lines.

The funnel 43 is preferably fixedly attached to the decoy body 13 by way of, for example, a bolt 51 which extends through the back of the decoy body 13, into the hollow interior 25 of the decoy body 13, and through the upper end 49 of the funnel 43, and a nut 53 which coacts with the bolt 51 to securely mount the funnel 43 at the desired location within the hollow interior 25 of the decoy body 13 (see FIG. 6). Alternatively, the upper end 49 of the funnel 43 may have an internally threaded aperture 55 therein and the bolt 51 may screw directly into the threaded aperture 55 to secure the funnel 43 to the decoy body 13 (see FIG. 9). In either case, a resilient washer 57 is preferably positioned between the upper end of the funnel 37 and the inner wall of the decoy body 13 to provide shock absorbency and the like. The washer 57 is preferably manufactured out of neoprene or the like. The washer 57 provides support and reduces side to side movement of the funnel 43. As shown most clearly in FIG. 3, the decoy body 13 typically has an arch above where the funnel 43 is attached at a natural balance point of the decoy body 13, and the washer 57 helps fill the inside void create by the arch. The funnel 43 is preferably mounted at the balancing point within the interior 25 of the decoy body 13 (i.e., the point where the decoy body 13 can be supported on the upper end 39 of the stake 15 in a normal, standing position). This balancing point can be found by supporting the decoy body 13 on a sharp pointed object that extends into the interior 25 and moving or adjusting the decoy body 13 until the decoy body 13 is perfectly balanced on the sharp pointed object. Then, a small hole 58 is made through the back of the decoy body 13 through which the shaft of the bolt 51 is extended (see FIGS. 3 and 9). The funnel 43 can then be attached to the bolt 51 and will be mounted at the balancing point.

A pivot member 59 is preferably provided inside the decoy body 13 for rotatably coacting with the upper end 33 of the stake 15. In the construction shown in FIG. 6, the pivot member 59 is formed by the lower end of the bolt 51. More specifically, in the construction shown in FIG. 6, the lower end of the bolt 51 is sharped to a fine point to form the pivot member 59, and the upper end 33 of the stake 15 preferably has a concave surface 60 for rotatably supporting the pivot peg 51 and, thus, the decoy body 13. The sharped, fine point on the lower end of the bolt 51 that forms the pivot member 59 will reduce friction and allow for easy movement of the decoy body 13 about the pivot member 59. In the construction shown in FIG. 9, the pivot member 59 is formed by a concave surface in the upper end 49 of the inner face 45 of the funnel 43, and the upper end 39 of the stake 15 is completely rounded or semi-spherical for rotatably supporting the concave upper end 49 of the funnel 43 and, thus, the decoy body 13. This roundness of the upper end 39 of the stake 15 allows the decoy body 13 to move freely on the stake 15 with no restriction. In both embodiments, the upper end 33 of the stake 15 is substantially blunt. Since most hunters put their decoys out in the field well before daylight, having the upper end 33 of the set-up stakes 15 substantially blunt improves the safety of the decoy spread in the event that someone might trip and fall on one or more up-right stakes 15, etc. In the embodiment shown in FIG. 6, the sharpened point of the lower end of the bolt 51 that forms the pivot member 59 is located within the hollow interior 25 of the decoy body 13 where it can hurt no one, leaving only the blunt, concave surface 60 of the upper end 39 of the stake 15 exposed during decoy set-up in the field, etc.

The decoy 11 preferably includes directional stop means 61 for limiting the rotation of the decoy body 13 on the stake 15. The directional stop means 61 preferably includes a first stop member 63 attached to the stake 15, and a coacting second stop member 65 attached to the decoy body 13 for engaging the first stop member 63 when the decoy body 13 has rotated a desired amount in a first direction on the stake 15 and for preventing further rotation of the decoy body 13 in that first direction. The first stop member 63 preferably includes an arm member 67 extending from the stake 15. The second stop member 65 preferably includes a first bumper member 69 for engaging the arm member 67 when the decoy body 13 has rotated in a first direction a desired amount, and a second bumper member 71 for engaging the arm member 67 when the decoy body 13 has rotated in a second direction a desired amount.

In the embodiment shown in FIGS. 3, 4, 6 and 7, the arm member 67 of the first stop member 63 may consist of a single, elongated arm or finger extending outwardly from the stake 15, and the funnel 43 of the guide means 17 preferably has a slot 73 therein for receiving the arm member 67 with a first side or side edge 75 of the slot 73 forming or defining the first bumper member 69, and with a second side or side edge 77 of the slot 73 forming or defining the second bumper member 71. In this embodiment of the stake 15, the upper end 39 thereof (with the concave surface 60) and the arm member 67 may be molded or otherwise constructed out of plastic or the like as a one-piece, integral unit, fixedly attached to the shaft-like lower end of the stake 15 with glue or the like as will now be apparent to those skilled in the art. As shown somewhat diagrammatically in FIG. 7, when the decoy body 13 fully rotates in a first direction (e.g., counter-clockwise), the arm member 67 will engage or bump against the first side edge 75 to prevent further rotation of the decoy body 13 in that first direction, and when the decoy body 13 fully rotates in a second direction (e.g., clockwise), the arm member 67 will engage or bump against the second side edge 77 to prevent further rotation of the decoy body 13 in that second direction. In this embodiment, both the first stop member 63 (i.e., the arm member 67) and the second stop member 65 (i.e., the first and second bumper members 69, 71) are positioned within the hollow interior 25 of the decoy body 13.

Figure 9:
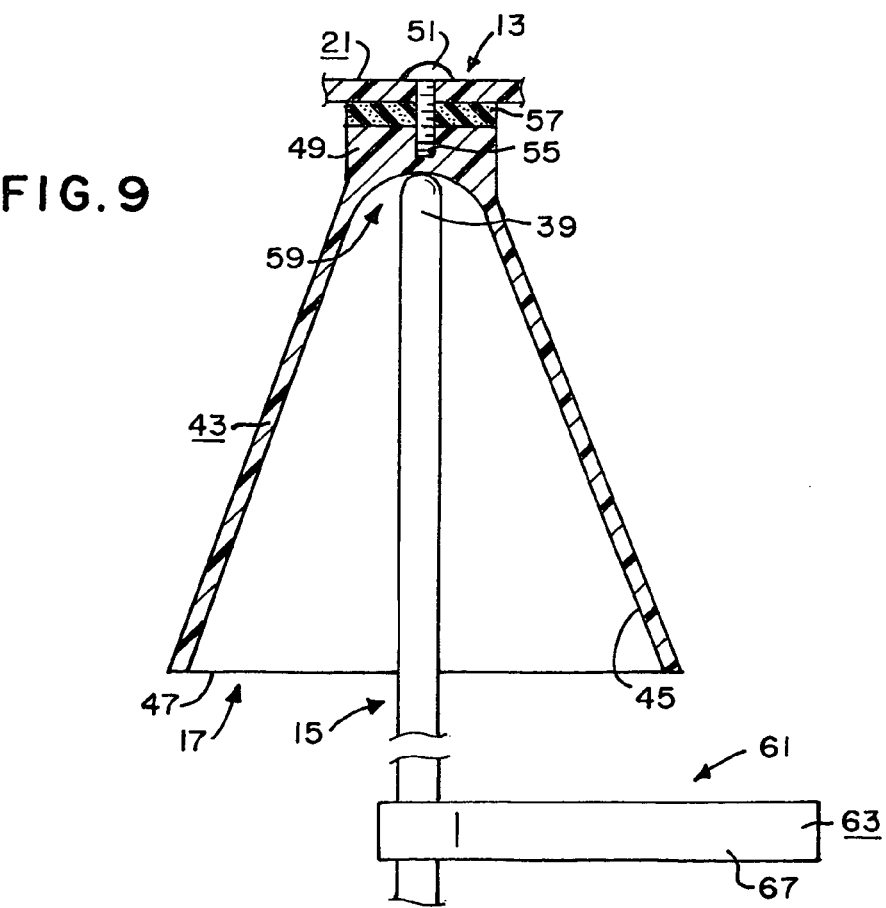
FIG. 9 is an enlarged sectional view of portions of the decoy of FIG. 8, with portions thereof broken away for clarity.
Figure 10:
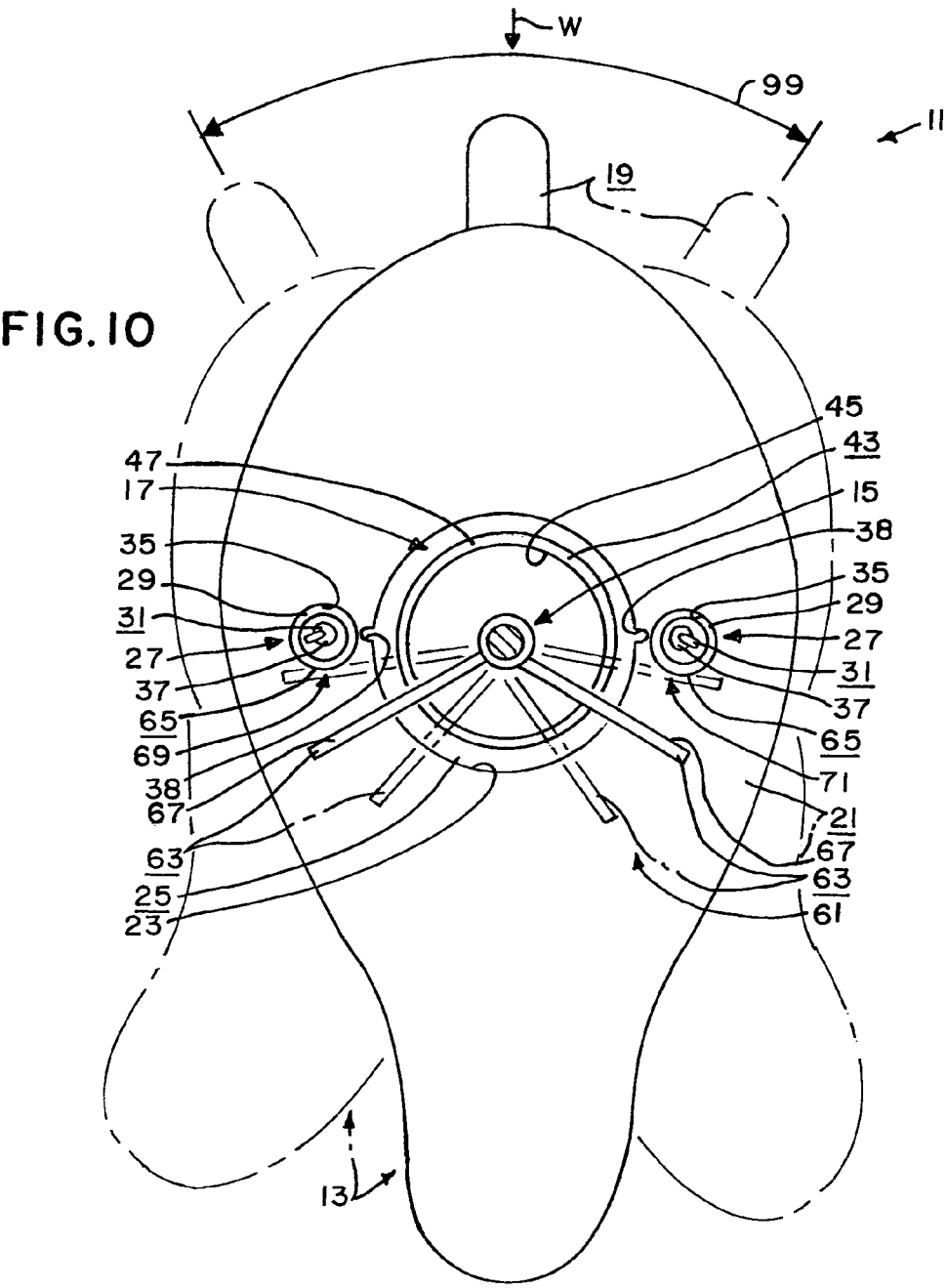
FIG. 10 is a bottom plan view of the decoy of FIG. 8, showing the range of motion of the decoy body thereof about a vertical axis in broken lines.

In the embodiment shown in FIGS. 8, 9 and 10, the arm member 67 of the first stop member 63 may consist of a pair of elongated arms or fingers extending rewardly from the stake 15 in a V-shaped manner (or may consist of a single elongated arm or finger extending rearward from the stake 15 and being generally V-shaped when view in plan), and the first and second leg stubs 27 form or define the first and second bumper members 69, 71. In this embodiment, the arm member 67 may be molded or otherwise constructed out of plastic or the like as a one-piece, integral unit, and fixedly attached to the stake 15 via a friction fit or the like as will now be apparent to those skilled in the art. As shown somewhat diagrammatically in FIG. 10, when the decoy body 13 fully rotates in a first direction (e.g., counter-clockwise), the arm member 67 will engage or bump against one leg stub 27 to prevent further rotation of the decoy body 13 in that first direction, and when the decoy body 13 fully rotates in a second direction (e.g., clockwise), the arm member 67 will engage or bump against the other leg stub 27 to prevent further rotation of the decoy body 13 in that second direction. The elastic cord 31 used to mount the leg stubs 27 to the decoy body 13 creates a spring that causes the decoy body 13 to bounce back in the opposite direction when the arm member 67 engages or bumps against either leg stub 27, giving the decoy 11 a walking effect. In this embodiment, both the first stop member 63 (i.e., the arm member 67) and the second stop member 65 (i.e., the leg stubs 27) are positioned below the decoy body 13. Further, if more decoy motion is desired, the arm member 67 can be slid down the stake 15 to a point when it does not engage either leg stub 27.

A first embodiment of the attachment means 22 for removably attaching the head portion 19 to a separate body portion 21 and for properly positioning the head portion 19 on the body portion 21 is shown in FIGS. 12-15. A second embodiment of the attachment means 22 for removably attaching the head portion 19 to a separate body portion 21 and for properly positioning the head portion 19 on the body portion 21 is shown in FIGS. 16-19. In both embodiments, the attachment means 22 includes a first male member 79 and a first female member 81 for coacting with one another to attach the head portion 19 to said body portion 21. In addition, the attachment means 22 includes a second male member 83 and a second female member 85 for coacting with one another to properly position the head portion 19 on the body portion 21. The first and second male members 79, 83 are preferably on head portion 19, while the first and second female members 81, 85 are preferably in the body portion 21. Both of these attachment means 22 provide a double locking system for removably attaching the head portion 19 to a separate body portion 21 and for properly positioning the head portion 19 on the body portion 21.

In the first embodiment of the attachment means 22 shown in FIGS. 12-15, the first male member 79 includes a first thread portion 87, and the first female member 81 includes a second thread portion 89 for screwably coacting with said first thread-like member of the first male member. 79. The first thread portion 87 may consist of one or more outwardly boss members extending outwardly from the body of the first male member 79 as clearly shown in FIGS. 12, 13 and 15; and the second thread portion 89 may consist of slots in the wall of the first female member 81 as clearly shown in FIGS. 12, 14 and 15, and for coacting with the boss members of the first thread portion 87 so that the head member 19 can merely be screwed onto the body portion 21 with the boss members of the first thread portion 87 engaging the slots of the second thread portion 89 to thus attach the head and body portions 19, 21 together, and can merely be unscrewed from the body portion 21 to separate the head and body portions 19, 21 as will now be apparent to those skilled in the art.

In the second embodiment of the attachment means 22 shown in FIGS. 16-19, the first male member 79 includes a snap-type projection 91, and the first female member 81 consist simply of an aperture or hole 93 in the body portion 21 for receiving the snap-type projection 91 so that the head member 19 can merely be pushed down onto the body portion 21 with the snap-type projection 91 being forced into the hole 93 to thus attach the head and body portions 19, 21 together, and can merely be pulled away from the body portion 21 to separate the head and body portions 19, 21 as will now be apparent to those skilled in the art.

In both embodiments of the of the attachment means 22, the second male member 83 preferably includes a hemispherical ball 95, and the second female member 85 preferably includes a hemispherical concavity 97 for receiving the hemispherical ball 95 of the second male member 83 to thereby lock the head portion 19 in the proper position on the body portion 21 as will now be apparent to those skilled in the art. The hemispherical ball 95 preferably depend down from the head portion 19 while the hemispherical concavity 97 preferably depends into the body portion 21 as clearly shown in FIGS. 12-19.

The decoy 11 may include directional lock means 101, as shown in FIGS. 20-25, for preventing any rotation of the decoy body 13 on the stake 15. The funnel 43 of the guide means 17 preferably has a slot 103 therein opposite the slot 73 for defining or forming the directional lock means 101 in combination with the first stop member 63 of the directional stop means 61. The slot 103 preferably has an upper end 105 that is approximately the same width as the cross sectional width of the arm member 67 of the first stop member 63, and has a relatively wide (as compared to the upper end 105) lower end or mouth portion 107 at the lower end 47 of the funnel 43 for receiving and guiding the arm member 67 to the upper end 105 of the slot 73 when the decoy body 13 is inserted over the upper end 39 of the stake 15 with the arm member 67 positioned so as to enter the mouth portion 107. The width of the mouth portion 107 preferably gradually increases as it approaches the lower end 47 of the funnel 43 to provide a relatively wide entrance for the arm member 67 (see FIG. 22) and to guide the arm member 67 to the upper end 105 of the slot 103 as will now be apparent to those skilled in the art. The funnel 43 may be molded or otherwise constructed out of various materials such as plastic, and the slot 103, like the slot 73, may be molded, cut, machined, or otherwise formed into the funnel 43.

The operation and use of the decoy 11 is quite simple. If the decoy body 13 has separate head and body portions 19, 21, the head portion 19 is merely screwed onto the body portion 21 (see FIGS. 12-15) or pushed onto the body portion 21 (see FIGS. 16-19), and rotated until the hemispherical ball 95 snaps into the hemispherical cavity 97 to insure proper positioning of the head portion 19 on the body portion 21. The lower end 41 of the stake 15 is merely pushed or otherwise inserted in the support surface S (see FIG. 1) or sat on top of the support surface S (see FIG. 8) at the desired location with the longitudinal axis of the stake 15 arranged generally vertical. Next, the decoy body 13 is merely inserted over the upper end 39 of the stake 15 by placing the aperture 23 in the bottom of the decoy body 13 over the upper end 39 of the stake 15 so that the upper end 39 of the stake 15 will pass through the aperture 23 into the hollow interior 25 of the decoy body 13 as the decoy body 13 is lowered onto the stake 15. As the decoy body 13 is so lowered, the upper end 39 of the stake 15 will engage the inner face 45 of the funnel 43 and the guide means 17 will guide the upper end 39 of the stake 15 into proper position in the decoy body 13 (e.g., with the pointed end of the bolt 51 rotatably supported on the concave surface 60 of the upper end 39 of the stake 15 as shown in FIG. 6; or with the concave surface in the upper end 49 of the inner face 45 of the funnel 43 rotatably supported on the spherical upper end 43 of the stake 15 as shown in FIG. 9). With the pivot member 59 (i.e., the pointed end of the bolt 51 or the concave surface in the upper end 49 of the funnel 43) located generally at the "balance point" of the decoy body 13, the stake 15 will support the decoy body 13 in a stable, upright position. The guide means 17 allows the hunter or other user of the decoy 11 to place the decoy body 13 on the stake 15 with ease in the dark. Thus when the hunter places aperture 23 in the bottom of the decoy body 13 over the stake 15 and drops the decoy body 13 downward, the funnel 43 guides the decoy body 13 onto the stake 15 until the upper end 39 of the stake 15 engages the pivot member 59. This will also guide the arm member 67 either generally into the slot 73 (in the embodiment of the directional stop means 61 shown, for example, in FIG. 4); or between the two stub legs 27 (in the embodiment of the directional stop means 61 shown, for example, in FIG. 10). Wind W (see FIGS. 2 and 10) will then cause the decoy body 13 to rotate back and forth an amount as indicated by the arrows 99 in FIGS. 2 and 10 and as limited by the directional stop means 61 and based on the differences in width of the arm member 67 and the width of the slot 73 or distance between the stub legs 27, so that the front of the decoy body 13 will face generally into the wind. Movement of the decoy body 13 on the stake 15 will be created with as little as 5 miles per hour wind. Slight changes in direction of the wind will cause the decoy body 13 to rotate on the stake 15. The directional stop means 61 will allow the decoy body 13 to move in the wind but limits the rotation to basically keep the decoy body 13 facing into the wind. However, if it is desired to prevent any movement of the decoy body 13 about a vertical axis, about the upper end 39 of the stake 15, etc., with the stake 15 is anchored to the support surface S, the decoy body 13 is merely inserted over the upper end 39 of the stake 15 with decoy body 13 positioned so that the slot 103 in the funnel 43 is aligned over the arm member 67 of the first stop member 63 so that the arm member 67 will first engage the mouth portion 107 of the slot 103 and then be guided thereby into the upper end 105 of the slot 103, whereby any and all rotational movement of the decoy body 13 on the upper end 39 of the stake 15 will be prevented so that the decoy body 13 will not rotate about a vertical axis, etc., regardless of the wind, etc. Without the directional stop means 61 or directional lock means 101, high winds could cause the decoy body 13 to spin in circles, creating a very un-natural look.

Although the present invention has been described and illustrated with respect to preferred embodiments and a preferred use therefor, it is not to be so limited since modifications and changes can be made therein which are within the full intended scope of the invention.

The invention claimed is:

1. An avian decoy comprising:
    (a) a decoy body;
    (b) a stake having an upper end for rotatably supporting said decoy body, and having a lower end for being anchored to a support surface;
    (c) an arm member extending from said stake; and
    (d) guide means for guiding said upper end of said stake into said decoy body; said guide means including a funnel for guiding said upper end of said stake into proper position; said funnel of said guide means having a first slot therein for receiving said arm member extending from said stake for limiting the rotation of said decoy body on said stake; and said funnel of said guide means having a second slot therein for receiving said arm member extending from said stake for preventing any rotation of said decoy body on said stake.

2. The decoy of claim 1 in which said first slot of said funnel is wider than the width of said arm member to allow a rotation of said decoy body on said stake when said arm member is positioned in said first slot; and in which said second slot of said funnel is the same width as said arm member to prevent any rotation of said decoy body on said stake when said arm member is positioned in said second slot.

* * * * *